Patented Nov. 12, 1929

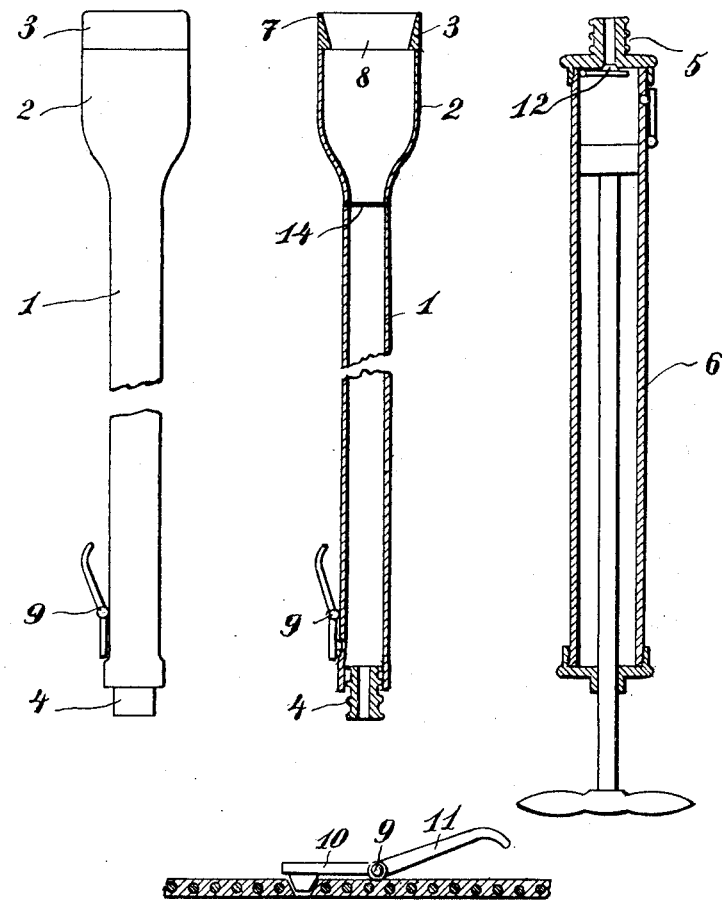

1,735,287

UNITED STATES PATENT OFFICE

OTTO LEHMANN, OF BIENNE, SWITZERLAND

DEVICE FOR REMOVING FOREIGN BODIES FROM THE GULLET OF ANIMALS, ESPECIALLY OF RUMINANTS

Application filed August 6, 1928, Serial No. 297,776, and in Switzerland August 29, 1927.

The present invention relates to a device for removing foreign bodies from the gullet of animals especially of ruminants and comprises a flexible not collapsible probang or probe having air-tight walls and an enlarged fore part, said fore part being provided with a rubber-lined end having a tapering edge and a thickened base best qualified for adhering tightly to the walls of the gullet while grasping the foreign body, the probang keeping sufficient stiffness so that in case of need the foreign bodies may be pushed into the cud without a risk of hurting the gullet. The invention comprises also a suction air pump having connecting means for attaching it to said probang so that the whole combination may be used for sucking the foreign bodies sticking in the gullet into the enlarged fore part, for grasping said bodies and for withdrawing the same together with the probang from the gullet.

The annexed drawing represents one working example of a device according to the present invention.

Fig. 1 is a side elevation of the probang and

Fig. 2 a longitudinal section of the same,

Fig. 3 is a longitudinal section through the air pump and

Fig. 4 an enlarged section of an air valve.

According to Figs. 1 to 3 the probang is a rubber hose pipe 1 wound internally with a wire so as to be flexible but not compressible. This pipe has an enlarged fore-part 2 provided with a soft rubber end ring 3. The back end of the probang carries an internally threaded nipple 4 as connecting means with the threaded orifice 5 of the air pump 6. The soft rubber end ring of the probang has a tapered edge 7 and an internal swelling 8 at its base so as to be well adapted to adhere tightly to the walls of the gullet with said edge and to grasp the foreign body firmly with said swelling.

Next to the nipple 4 of the probang is arranged an auxiliary air valve 9 represented in detail in Fig. 4 and intended to furnish the means for admitting the air when relieving the vacuum within the probang. The valve comprises a conical rubber piston 10 fitted into a corresponding hole of the probang and attached to a two armed lever 11 and kept closed by a spring not shown. Similar valves 12 and 13 are provided one as a nonreturn valve next to the pump next to said orifice. Finally there is a sieve 14 arranged inside of the probang between its enlarged and the narrow part.

The working of the device is as follows:

At first the probang is well oiled so as to render it slippery then it is introduced into the gullet until it is stopped by the foreign body. The pump is attached to the probang and an occasional remnant of food is first pumped into the enlarged part of the probang and removed, whereupon by a slight pressure on the foreign body, which in most cases as with cattle is an apple, this body is seized and the pump worked until the best possible vacuum has been obtained. Now by some turns and by a retreating movement the probang with the foreign body is extracted.

If need be the air can be admitted into the probang at any moment during the process by a slight pressure on the lever 9.

Sometimes the foreign body after being released from its wedging is swallowed down by the animal or can be easily pushed down into the cud. In this case the enlarged part of the probang and the soft rubber ring gives all security against a lesion of the gullet.

The valve 9 could be left off and the connection between probang and gullet be otherwise than shown. Also the valves could be spring controlled ball valves.

Finally the device could be completed by providing a drill for fixing the foreign body by boring. This drill would be worked by means of a flexible shaft passing through the probang and provided with a handle while the pump would be attached to a branch pipe connected with the probang.

The communication between the pump and the probang would be the same as that shown in the drawing and the flexible shaft and drill would be introduced through the branch neck of the probang.

With this arrangement the foreign body can first be seized by means of the soft rubber ring of the probang and held fast, while the drill is worked so as to make a safe incision, whereupon the body may be easily extracted together with the probang.

What I claim as new is:

1. In a device for removing foreign bodies from the gullet of animals especially of ruminants and in combination, a flexible but not compressible probang having an enlarged fore end, a soft rubber end ring attached to this enlarged fore end and having a tapered edge and an internal swelling at the base, a sieve intercalated between the enlarged and the narrow part of the probang, an air pump provided with spring controlled valves, one as a nonreturn valve inside of its orifice and the other as a venting valve in the wall next to said orifice, and co-acting connecting means at the back end of the probang and at the fore end of the air pump, the whole constituting the means for sucking the foreign body fast to the rubber ring and to extract it with the probang.

2. In a device for removing foreign bodies from the gullet of animals especially of ruminants and in combination, a flexible, but not compressible probang having an enlarged fore end and an auxiliary venting valve next to the rear end of said probang, a soft rubber end ring attached to this enlarged fore end and having a tapered edge and an internal swelling at the base, a sieve intercalated between the enlarged and the narrow part of the probang, an air pump provided with spring controlled valves, one as a nonreturn valve inside of its orifice and the other as a venting valve in the wall next to said orifice, and coacting connecting means at the back end of the probang and at the fore end of the air pump, the whole constituting the means for sucking the foreign body fast to the rubber ring and to extract it with the probang.

In testimony whereof I affix my signature.

Dr. OTTO LEHMANN.